US012219022B2

(12) United States Patent
Rivera

(10) Patent No.: US 12,219,022 B2
(45) Date of Patent: Feb. 4, 2025

(54) BROWSER SERVER SESSION TRANSFER

(71) Applicant: Citrix Systems, Inc., Fort Lauderdale, FL (US)

(72) Inventor: Juan Rivera, Doral, FL (US)

( * ) Notice: Subject to any disclaimer, the term of this patent is extended or adjusted under 35 U.S.C. 154(b) by 546 days.

(21) Appl. No.: 17/366,220

(22) Filed: Jul. 2, 2021

(65) Prior Publication Data

US 2021/0337034 A1 Oct. 28, 2021

Related U.S. Application Data

(63) Continuation of application No. 14/886,243, filed on Oct. 19, 2015, now Pat. No. 11,082,499.

(51) Int. Cl.
*H04L 67/148* (2022.01)
*H04L 67/02* (2022.01)
*H04L 67/142* (2022.01)
*H04L 67/146* (2022.01)

(52) U.S. Cl.
CPC ............ *H04L 67/148* (2013.01); *H04L 67/02* (2013.01); *H04L 67/142* (2013.01); *H04L 67/146* (2013.01)

(58) Field of Classification Search
CPC ..... H04L 67/148; H04L 67/02; H04L 67/142; H04L 67/146
USPC ......................................................... 709/228
See application file for complete search history.

(56) References Cited

U.S. PATENT DOCUMENTS

| 6,947,982 | B1 | 9/2005 | McGann et al. | |
| 2005/0038849 | A1* | 2/2005 | Kaluskar et al. | G06F 9/5094 709/224 |
| 2007/0198721 | A1* | 8/2007 | Ikawa | H04L 67/1012 709/226 |
| 2009/0106571 | A1* | 4/2009 | Low | G06F 9/5094 709/224 |
| 2009/0300189 | A1 | 12/2009 | Takeda et al. | |
| 2012/0197971 | A1* | 8/2012 | Jiang | H04L 67/1027 709/223 |
| 2013/0054822 | A1* | 2/2013 | Mordani | H04L 69/40 709/228 |

(Continued)

OTHER PUBLICATIONS

J. Wang, Y. Huang and A. Ghosh, "SafeFox: A Safe Lightweight Virtual Browsing Environment," 2010 43rd Hawaii International Conference on System Sciences, Honolulu, HI, USA, 2010, pp. 1-10, (Year: 2010).*

(Continued)

*Primary Examiner* — Taylor A Elfervig

(57) ABSTRACT

Methods, systems, and computer-readable media for transferring hosted web browser sessions between browser servers are described herein. In various embodiments, a broker service may create a browser server pool from a plurality of browser servers. The broker service may connect a client agent with a first web browser session in a first browser server in the browser server pool. The broker service, responsive to a determination that the first web browser session needs to be transferred to a second browser server in the browser server pool, may request and receive a session context from the first web browser session, launch a second web browser session in the second browser server, initialize the second web browser session with the session context from the first web browser session, transfer the client agent from the first web browser session to the second web browser session, and terminate the first web browser session.

17 Claims, 9 Drawing Sheets

(56) References Cited

U.S. PATENT DOCUMENTS

| | | | |
|---|---|---|---|
| 2013/0060838 A1 | 3/2013 | Yaffe | |
| 2013/0111047 A1* | 5/2013 | Ghafoor | H04L 63/06 709/229 |
| 2013/0254685 A1* | 9/2013 | Batraski | H04L 67/1095 715/760 |
| 2014/0032706 A1* | 1/2014 | Kuscher | G06F 9/4856 709/217 |
| 2014/0053054 A1 | 2/2014 | Shen et al. | |
| 2015/0189004 A1* | 7/2015 | Massover | H04L 67/1027 709/223 |
| 2016/0112464 A1* | 4/2016 | Nyshadham | H04L 65/1069 709/227 |
| 2016/0125343 A1* | 5/2016 | O'Dea | G06Q 10/063112 705/7.26 |
| 2016/0127232 A1 | 5/2016 | Kano | |
| 2016/0191343 A1* | 6/2016 | Dong | G06F 9/5083 709/226 |

OTHER PUBLICATIONS

G.-H. Hwang, "Supporting Cloud Computing in Thin-Client/Server Computing Model," International Symposium on Parallel and Distributed Processing with Applications, Taipei, Taiwan, 2010, pp. 612-618 (Year: 2010).*

A. Hemapriya, M. S. Bhuvaneswari and K. Muneeswaran, "Reconstruction of user sessions from Web server log," 2015 International Conference on Computing and Communications Technologies (ICCCT), Chennai, India, 2015, pp. 37-42 (Year: 2015).*

Luis Miguel Torres, E. Magaña, M. Izal and D. Morato, "Identifying sessions to websites as an aggregation of related flows," 2012 15th International Telecommunications Network Strategy and Planning Symposium (Networks), Rome, Italy, 2012, pp. 1-6 (Year: 2012).*

"Use Continuity to Connect your iPhone, iPad, iPod Touch, and Mac"—https://support.apple.com/en-us/HT204681—7 pages.

Jul. 21, 2017—(US) Non-final Office Action—U.S. Appl. No. 14/886,243.

Dec. 27, 2017—(US) Final Office Action—U.S. Appl. No. 14/886,243.

Aug. 31, 2018—(US) Non-final Office Action—U.S. Appl. No. 14/886,243.

Mar. 21, 2019—(US) Final Office Action—U.S. Appl. No. 14/886,243.

Oct. 7, 2019—(US) Non-final Office Action—U.S. Appl. No. 14/886,243.

Apr. 14, 2020—(US) Final Office Action—U.S. Appl. No. 14/886,243.

Jan. 1, 2021—(US) Non-final Office—U.S. Appl. No. 14/886,243.

Apr. 7, 2021—(US) Notice of Allowance—U.S. Appl. No. 14/886,243.

* cited by examiner

BROWSER SERVER SESSION TRANSFER

CROSS-REFERENCE TO RELATED APPLICATIONS

This application is a continuation of co-pending non-provisional U.S. application Ser. No. 14/886,243 filed Oct. 19, 2015, entitled "Browser Server Session Transfer," which is herein incorporated by reference in its entirety.

FIELD

Aspects described herein generally relate to computers, networking, hardware, and software. In particular, one or more aspects of the disclosure generally relate to computer hardware and software for transferring hosted web browser sessions between browser servers in a browser server pool.

BACKGROUND

Many enterprises (e.g., corporations, partnerships, governments, academic institutions, other organizations, etc.) are now using virtualization and clouds of computing resources to fulfill their information technology and computing needs. A common use of application virtualization is to publish hosted web browser applications. The virtualization technology used by the web browser application providers allows a single virtual server to deploy one or more remote desktop services (RDS) sessions to one or more users simultaneously. RDS deployments offer a cost-effective means of servicing a large number of users with a relatively small number of virtual servers. That is, RDS deployments offer a large user density across the pool of virtual servers. However, RDS deployments are not without problems.

One of the challenges with RDS deployments is the difficulty of managing the server load across the pool of virtual servers. Once a user is assigned to a hosted web browser session in a virtual server, that user typically cannot be transferred to another virtual server while maintaining the context of the session. The result is that after a period of time, as some users logoff, other users remain, and new users are added, the server load across the pool of virtual servers is not balanced. Many virtual servers may have only a handful of users logged on, some virtual servers may be near full capacity, while others may have no users logged on at all. This challenge becomes even more important in large public clouds where the cost of running one virtual server is the same regardless of the number of users logged into the virtual server. The ability to rebalance server load across the virtual server pool would allow web browser application providers to consolidate users to a smaller number of virtual servers thus reducing the number of virtual servers required in the virtual server pool.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards transferring hosted web browser sessions between browser servers in a browser server pool. In particular, aspects of the disclosure provide efficient, cost-effective, and convenient ways for a web browser session service provider to deliver hosted web browser sessions with less browser servers than typically required. Aspects of the disclosure described in greater detail below may be used by web browser session service providers to rebalance server load across the browser server pool thus reducing the number of browser servers required during off-peak times regardless of the user distribution across the browser server pool. Further cost savings may be achieved by powering down any unused browser servers with no active web browser sessions.

In one or more arrangements discussed in greater detail below, a broker service may create a browser server pool from a plurality of browser servers. The broker service may connect a client to a first web browser session in a first browser server in the browser server pool. The broker service may determine whether the first browser session in the first browser server needs to be transferred to a second browser server in the browser server pool. Responsive to determining that the first browser session in the first browser server needs to be transferred to the second browser server, the broker service may request a session context from the first web browser session in the first browser server; receive a session context from the first web browser session in the first browser server in response to the session context request; launch a second web browser session in the second server; initialize the second web browser session in the second browser server with the session context of the first web browser session; transfer the client agent from the first web browser session in the first browser server to the second web browser session in the second browser server, while maintaining the session context; and terminate the first web browser session in the first browser server.

In one or more embodiments, the broker service may be further configured to determine whether the first browser server has no active web browser sessions. Responsive to determining that the first browser server has no active web browser sessions, the broker service may power down the first browser server.

In some embodiments, the broker service determination whether the first web browser session in the first browser server needs to be transferred to the second browser server may comprise the broker service monitoring server load across the browser server pool and balancing the server load across the browser server pool.

In other arrangements, the plurality of browser servers in the browser server pool may be configured to provide remote desktop server functionality. Alternatively, in yet other arrangements, the plurality of browser servers in the browser server pool may be hosted in a cloud service.

In other embodiments, the web browser sessions executing in the browser servers may comprise a browser helper object. The browser helper object may be configured to receive, from the broker service, a session context request. The browser helper object may be further configured to, in response to the session context request, access the session context information of the web browser session within which the browser helper object is executing, serialize the session context information, and transmit the serialized session context information to the broker service. The session context information may comprise one or more session cookies, one or more uniform record locator (URL) addresses, and one or more Hypertext Transfer Protocol (HTTP) headers.

Systems and non-transitory computer readable media may be configured to provide and/or support various aspects described herein. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems, methods, and techniques for transferring hosted web browser sessions between browser servers in a browser server pool.

Before discussing these concepts in greater detail, several examples of computing architecture and systems that may be used in implementing and/or otherwise providing various aspects of the disclosure will first be discussed with respect to FIGS. 1-4.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
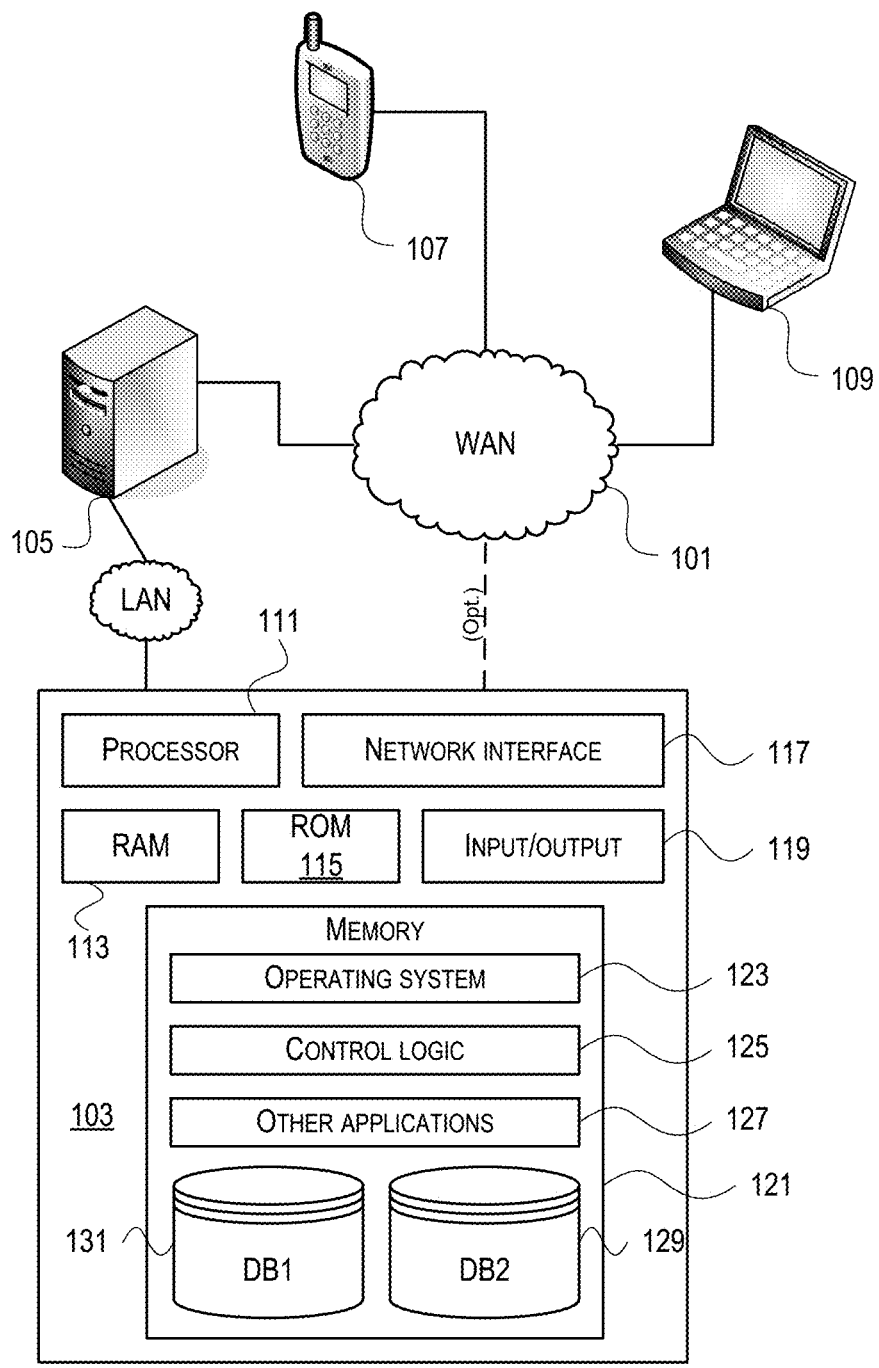
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
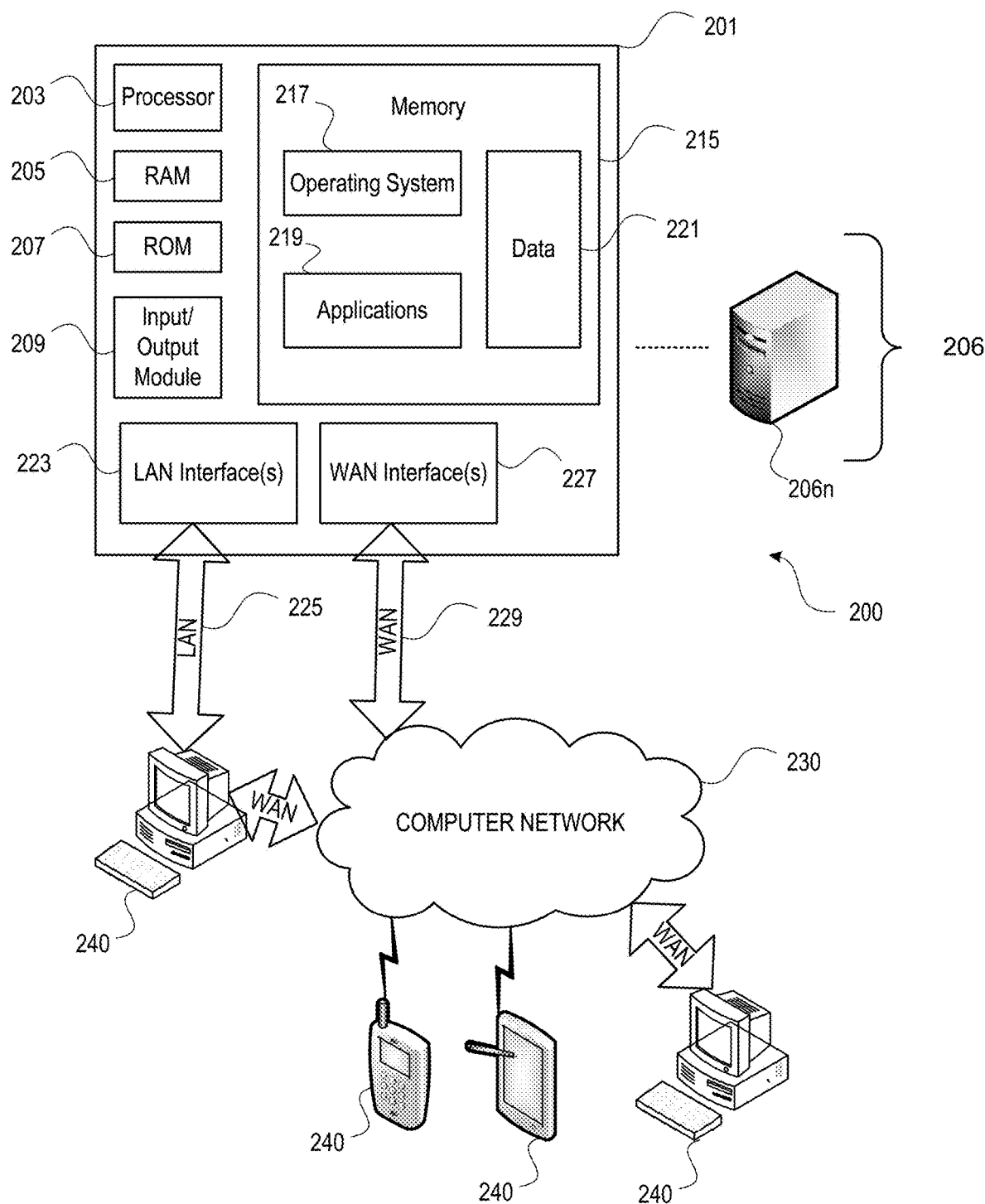
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
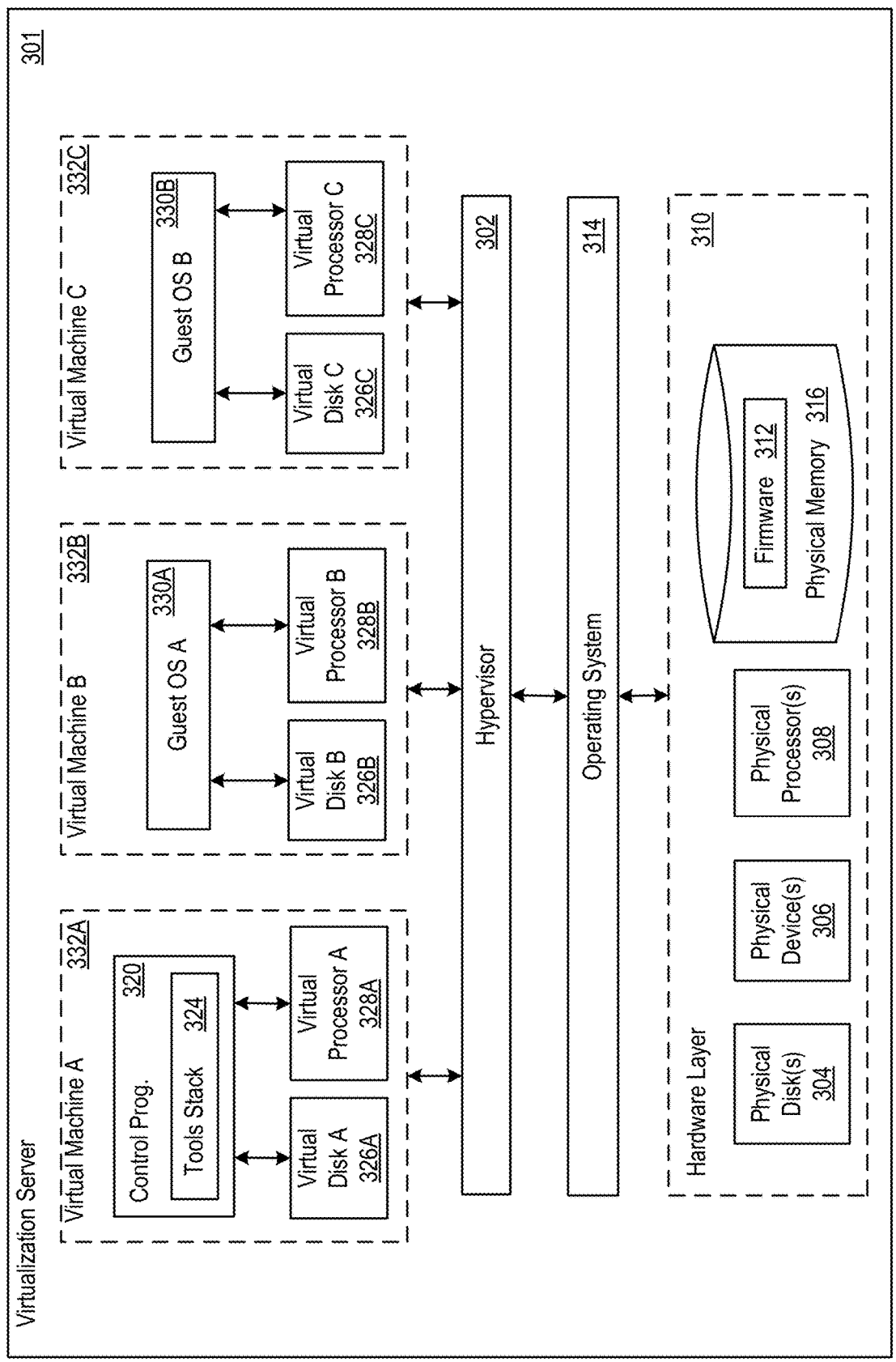
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, California; the XENPROJECT hypervisor, an open source product whose development is overseen by the open source XenProject.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
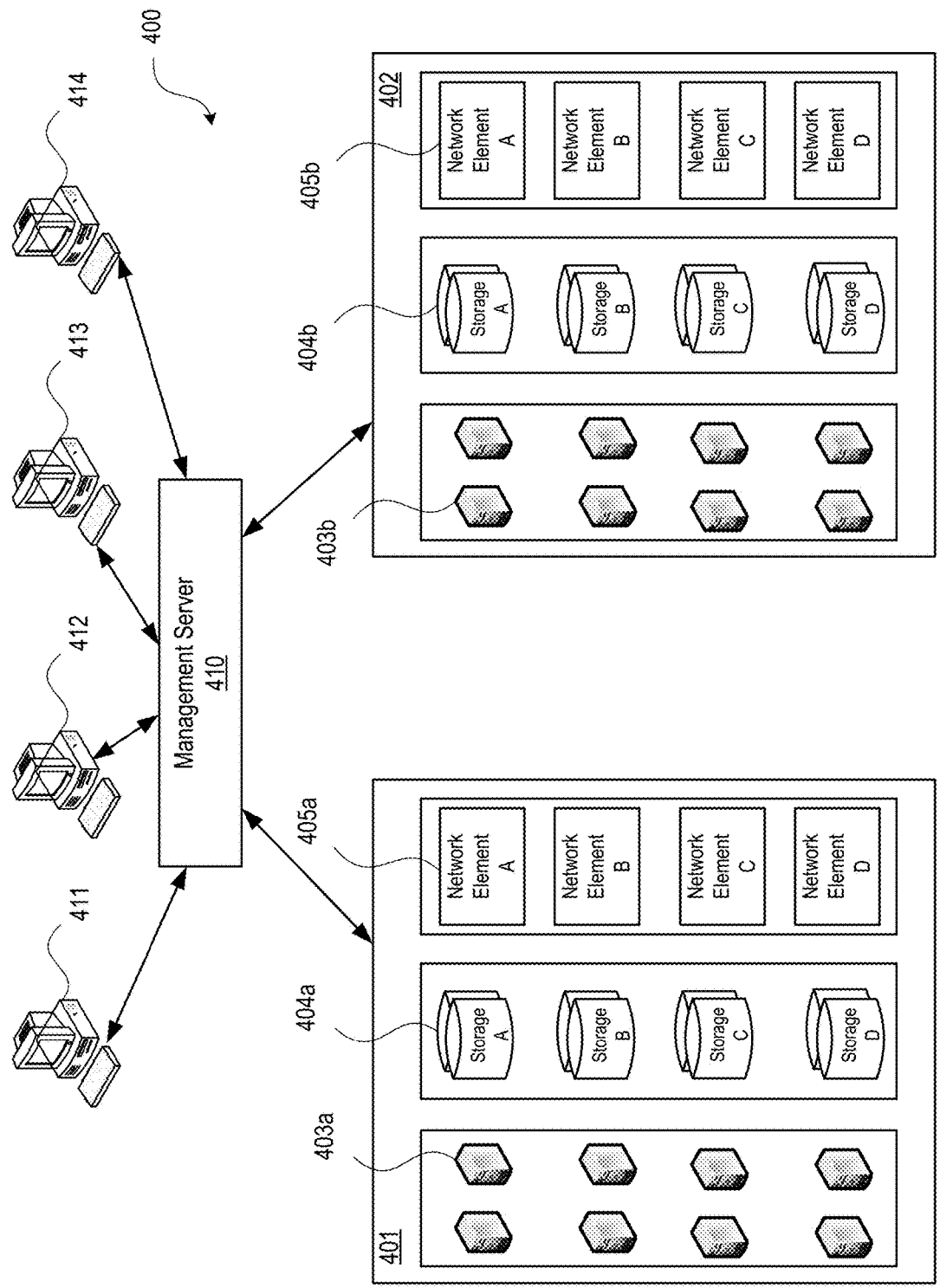
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDPLATFORM by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Browser Server Session Transfer

Having discussed several examples of the computing architecture that may be used in providing and/or implementing various aspects of the disclosure, a number of embodiments will now be discussed in greater detail. In particular, and as introduced above, some aspects of the disclosure generally relate to transferring browser sessions between servers. In the description below, various examples illustrating how a web browser server session may be transferred from one browser server to another browser server in accordance with one or more embodiments will be discussed.

Figure 5:
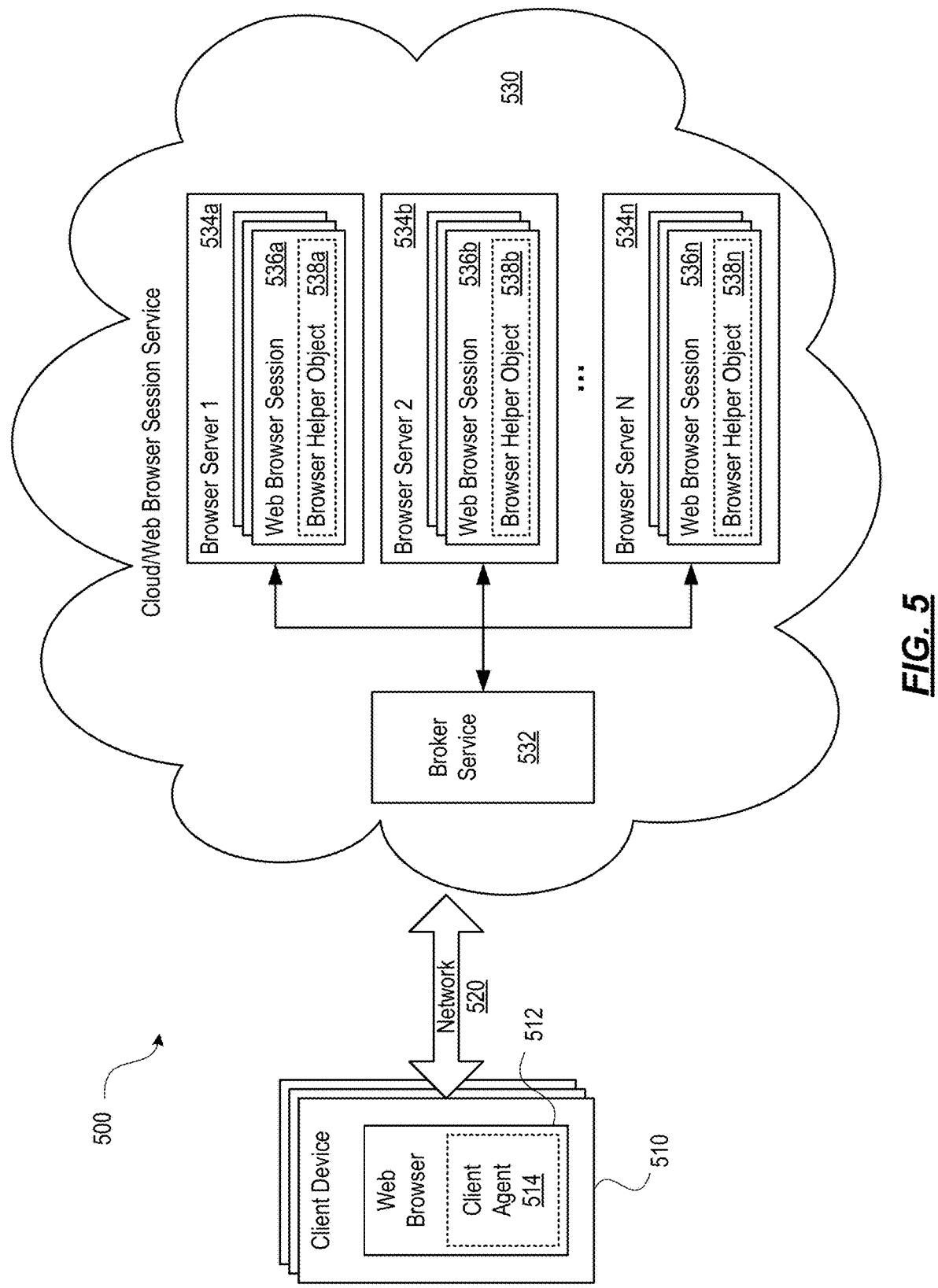
FIG. 5 depicts an illustrative system architecture which may be used for transferring a web browser server session from one browser server to another browser server in accordance with one or more illustrative aspects described herein.

FIG. 5 depicts an illustrative system architecture which may be used for transferring a web browser server session from one browser server to another browser server. As seen in FIG. 5, one or more client computing devices 510 may communicate with a web browser session service 530 over network 520 to access one or more hosted web browser sessions 536. The architecture of the system depicted in FIG. 5 is similar in many respects to the architecture of the cloud computing environment 400 described above with reference to FIG. 4 and may include additional features not mentioned above. Some of the components of the cloud computing environment 400 described above with reference to FIG. 4 have been omitted for the sake of simplicity.

The computing environment 500 may include one or more client devices 510. Client computing devices 510 may be any type of computing device capable of receiving and processing input via one or more user interfaces, providing output via one or more user interfaces and communicating input, output, and/or other information to and/or from one or more other computing devices. For example, client computing devices 510 may be a server computer, a desktop computer, a laptop computer, a tablet computer, a smart phone, or the like. In addition, the client devices 510 may be one of the computing devices described above in reference to FIGS. 1, 2, and 4 (e.g., devices 103, 105, 107, 109, 240, and 411-414.)

The client computing devices 510 may include a web browser application 512. For example, web browser application 512 may comprise a web browser application executing in client computing device 510. The web browser application 512 can be any one of the following non-exhaustive list of web browser applications: Internet Explorer® web browser application, manufactured by the Microsoft Corporation of Redmond, Washington, and CHROME web browser application, manufactured by the Google Corporation of Mountain View, California.

The web browser application 512 may include a client agent 514. The client agent 514 may comprise a plugin component, such as an ActiveX control or Java control or any other type and/or form of executable instructions capable of loading into and executing in the web browser application 512. For example, the client agent 518 may comprise an ActiveX control loaded and run by a web browser application 512, such as in the memory space or context of the web browser application 512. The client agent 518 may be configured to present the content of the hosted web browser session 536 within the web browser application 512. For example, the client agent 514, e.g., a client agent such as CITRIX RECEIVER, may use a thin-client or remote-display protocol to present display output generated by the hosted web browser session 536 executing on browser server 534 to the web browser application 512. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington. The client agent 518 may also transmit navigation commands from the web browser application 512 to the hosted web browser session 536.

Computing environment 500 also may include one or more networks, which may interconnect one or more of client devices 510, broker service 532, and one or more of browser servers 534. For example, computing environment 500 may include network 520, which may include one or more private networks (which may, e.g., be operated by and/or associated with an organization that operates web browser session service 530 and which may include one or more local area networks, wide area networks, virtual private networks, etc.) and/or one or more public networks (e.g., the Internet).

Referring to FIG. 5, computing environment 500 may include a web browser session service 530. The web browser session service 530 may include one or more browser servers 534 configured to provide one or more web browser sessions 536. Each of the browser servers 534 in the web browser session service 530 may be a single-server or multi-server system, or a cloud-based system, including at least one virtualization server, as described above with reference to FIG. 4. The browser servers 534 may be configured as multi-session servers capable of deploying one or more remote desktop services (RDS) to one or more users simultaneously. For example, in one embodiment, XENAPP manufactured by Citrix Systems, Inc. of Fort Lauderdale, Florida, may be adapted to provide one or more functions described herein. Other known cloud systems may alternatively be adapted as well, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others. The web browser session service 530 hardware and software resources may include private and/or public components. For example, the web browser session service 530 may be configured as a private cloud to be used by one or more particular customers or client computers 510 and/or over a private network. In other embodiments, public clouds or hybrid public-private clouds may be used by other customers over open or hybrid networks.

The web browser sessions 536 may comprise a web browser application. The web browser application 536 can be any one of the following non-exhaustive list of web browser applications: Internet Explorer® web browser application, manufactured by the Microsoft Corporation of Redmond, Washington, and CHROME web browser application, manufactured by the Google Corporation of Mountain View, California. The web browser sessions 536 may include a browser helper object 538. The browser helper object 538 may comprise a plugin component, such as an ActiveX control or Java control or any other type and/or form of executable instructions capable of loading into and executing in the web browser application 536. For example, the browser helper object 538 may comprise an ActiveX control loaded and run by a web browser application 536, such as in the memory space or context of the web browser application 536. The browser helper object 538 may be configured to access the session context information for the web browser session 536, serialize the session context information, and transmit the serialized session context information in response to a request. The session context information may include one or more session cookies, one or more uniform record locator (URL) addresses, one or more Hypertext Transfer Protocol (HTTP) headers, and the like. The browser helper object 538 may be further configured to initialize the session context information of the web browser session 536 with the serialized session context information from a different web browser session.

The web browser session service 530 may also include a broker service 532. The broker service 532 may be configured to create and manage one or more browser servers 534 and perform other administration tasks. For example, broker service 532 may create a browser server pool from a plurality of browser servers 534. Broker service 532 may be further configured to broker connections between client devices 510 and the web browser sessions 536 running in the browser server pool 534. The broker service 532 may use one or more criteria to determine which one of the browser servers 534 in the browser server pool 534 to connect to the client device 510. In one of several possible embodiments, the broker service 532 may randomly select a browser server 534 from the browser server pool 534. In other embodiments, the broker service 532 may select a browser server 534 from the browser server pool 534 in a round-robin fashion.

The broker service 532 may determine that an active web browser session 536 needs to be transferred from one browser server 534 to another browser server 534 in the browser server pool 534. For example, broker service 532 may be configured to monitor one or more server load and performance metrics regarding the plurality of browser servers 534 in the browser server pool 534. The broker service 532 may be further configured to balance the server load across the browser server pool 534 based on the monitored server load and performance metrics. That is, the broker service 532 may determine that an active web browser session 536 needs to be transferred from one browser server 534 to another browser server 534 in order to balance the server load across the browser server pool 534. For example, broker service 532 may determine that active web browser session 1 536*a* may need to be transferred from browser server 1 534*a* to browser server 2 534*b*. Responsive to that determination, the broker service 532 may request the session context information from web browser session 1 536*a*. In response to the request from the broker service 532, the web browser session 1 536*a* may request browser helper object 1 538*a* to generate and transmit the session context information for web browser session 1 536*a*. The browser helper object 1 538*a*, responsive to the request from the web browser session 1 536*a*, may access the session context information of web browser session 1 536*a*, serialize the session context information, and transmit the serialized session context information to the broker service 532. The session context information may include one or more session cookies, one or more uniform record locator (URL) addresses, one or more Hypertext Transfer Protocol (HTTP) headers, and the like. The broker service 532 may receive, in response to the session context request, the serialized session context information from web browser session 1 536*a* in browser server 1 534*a*. The broker service 532 may launch web browser session 2 536*b* in browser server 2 534*b* and initialize web browser session 2 536*b* with the serialized session context information from web browser session 1 536*a*. After initialization, web browser session 2 536*b* may be in the same location and in the same state as web browser session 1 536*a*. The broker service 532 may transfer the client agent 514 from web browser session 1 536*a* to web browser session 2 536*b*, while maintaining the session context of web browser session 1 536*a*. The broker service 532 may switch the client agent 514 from web browser session 1 536*a* to web browser session 2 536*b* in such a manner as to minimize user disruption. That is, broker service 532 may transfer the web browser sessions 536 in a seamless and transparent manner such that there is no apparent indication to the user operating the client device 510 that the transfer occurred. The broker service 532 may terminate web browser session 1 536*a* in browser server 1 534*a*. In some embodiments, the broker service 532 may be further configured to power down browser server 1 534*a* if or when the broker service 532 determines that browser server 1 534*a* no longer has any active web browser sessions 536.

Advantageously, and as illustrated in greater detail above, the methods and techniques described herein may be used to rebalance server load across the browser server pool thus reducing the number of browser servers required during off-peak times regardless of the user distribution across the browser server pool. Further cost savings may be achieved by powering down any unused browser servers with no active web browser sessions.

FIG. 5 illustrates just one example of a system architecture that may be used, and those of skill in the art will appreciate that the specific system architecture and computing devices used may vary, and are secondary to the functionality that they provide, as further described herein. For example, the functionality provided by the broker service 532 may be executed on a single computing device or on multiple computing devices at one site or distributed across multiple sites and interconnected by a communication network.

Figure 6A:
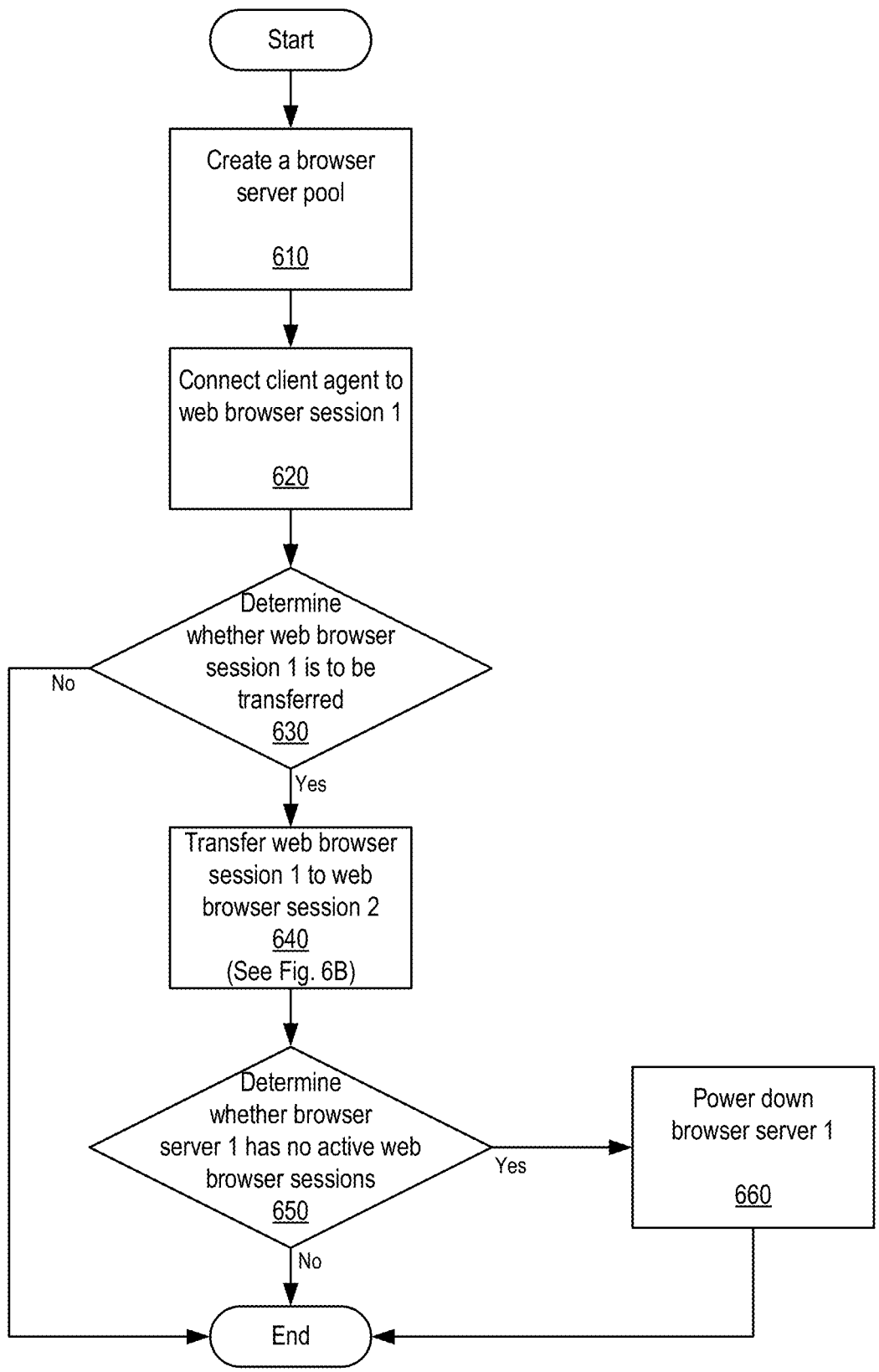
FIGS. 6A-6B depict a flowchart that illustrates a method of transferring a web browser server session from one browser server to another browser server in a browser server pool in accordance with one or more illustrative aspects described herein.
Figure 6B:
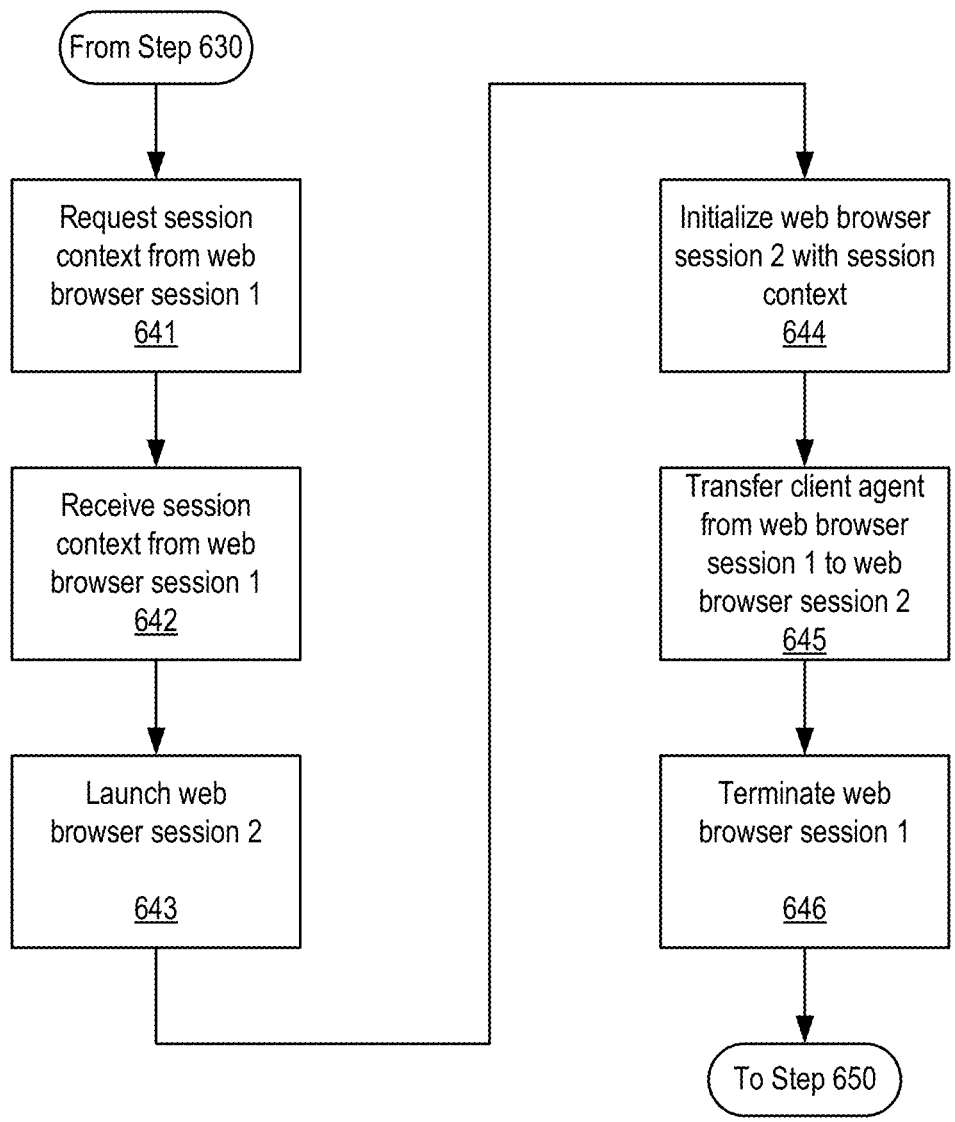

FIGS. 6A-6B depict a flowchart that illustrates a method of transferring a web browser server session from one browser server to another browser server in a browser server pool. The algorithm shown in FIGS. 6A-6B and other similar examples described herein may be performed in a computing environment such as the system illustrated in FIG. 5, as well as other systems having different architectures (e.g., all or part of FIGS. 1-4). In other embodiments, the method illustrated in FIG. 6 and/or one or more steps thereof may be embodied in a computer-readable medium, such as a non-transitory computer readable memory.

Referring to FIG. 6A, in step 610, broker service 532 may create a browser server pool from a plurality of browser servers 534. The broker service 532 may, in step 620, broker a connection between client devices 510 and the web browser sessions 536 running in the browser server pool 534. The broker service 532 may use one or more criteria to determine one of the browser servers 534 in the browser server pool 534 to connect to the client device 510. In one of several possible embodiments, the broker service 532 may randomly select a browser server 534 from the browser server pool 534. In other embodiments, the broker service 532 may select a browser server 534 from the browser server pool 534 in a round-robin fashion. For example, broker service 532 may broker a connection between client device 510 and web browser session 1 536a running in browser server 1 534a. In step 630, the broker service 532 may determine whether active web browser session 1 536a needs to be transferred to browser server 2 534b. If or when it is determined, in step 630, that active web browser session 1 536a needs to be transferred, then broker service 532 may transfer web browser session 1 536a to browser server 2 534b as shown in step 640, and described in further detail below in reference to FIG. 6B. In step 650, the broker service 532 may determine whether browser server 1 534a has no active web browser sessions 536. If or when it is determined, in step 650, that browser server 1 534a has no active web browser sessions 536, then broker service 532 may power down browser server 1 534a.

Referring to FIG. 6B, in step 641, the broker service 532 may request the session context information from web browser session 1 536a. In response to the request from the broker service 532, the broker service 532 may receive session context information from web browser session 1 536a, as shown in step 642. The session context information may include one or more session cookies, one or more uniform record locator (URL) addresses, one or more Hypertext Transfer Protocol (HTTP) headers, and the like.

In step 643, the broker service 532 may launch web browser session 2 536b. The broker service 532 may initialize web browser session 2 536b with the serialized session context information from web browser session 1 536a, as shown in step 644. After initialization, web browser session 2 536b may be in the same location and in the same state as web browser session 1 536a. In step 645, the broker service 532 may transfer the client agent 514 from web browser session 1 536a to web browser session 2 536b, while maintaining the session context of web browser session 1 536a. The broker service 532 may switch the client agent 514 from web browser session 1 536a to web browser session 2 536b in such a manner as to minimize user disruption. That is, broker service 532 may transfer the web browser sessions 536 in a seamless and transparent manner such that there is no apparent indication to the user operating the client device 510 that the transfer occurred. The method then proceeds to step 650, as described above in reference to FIG. 6A.

Figure 7A:
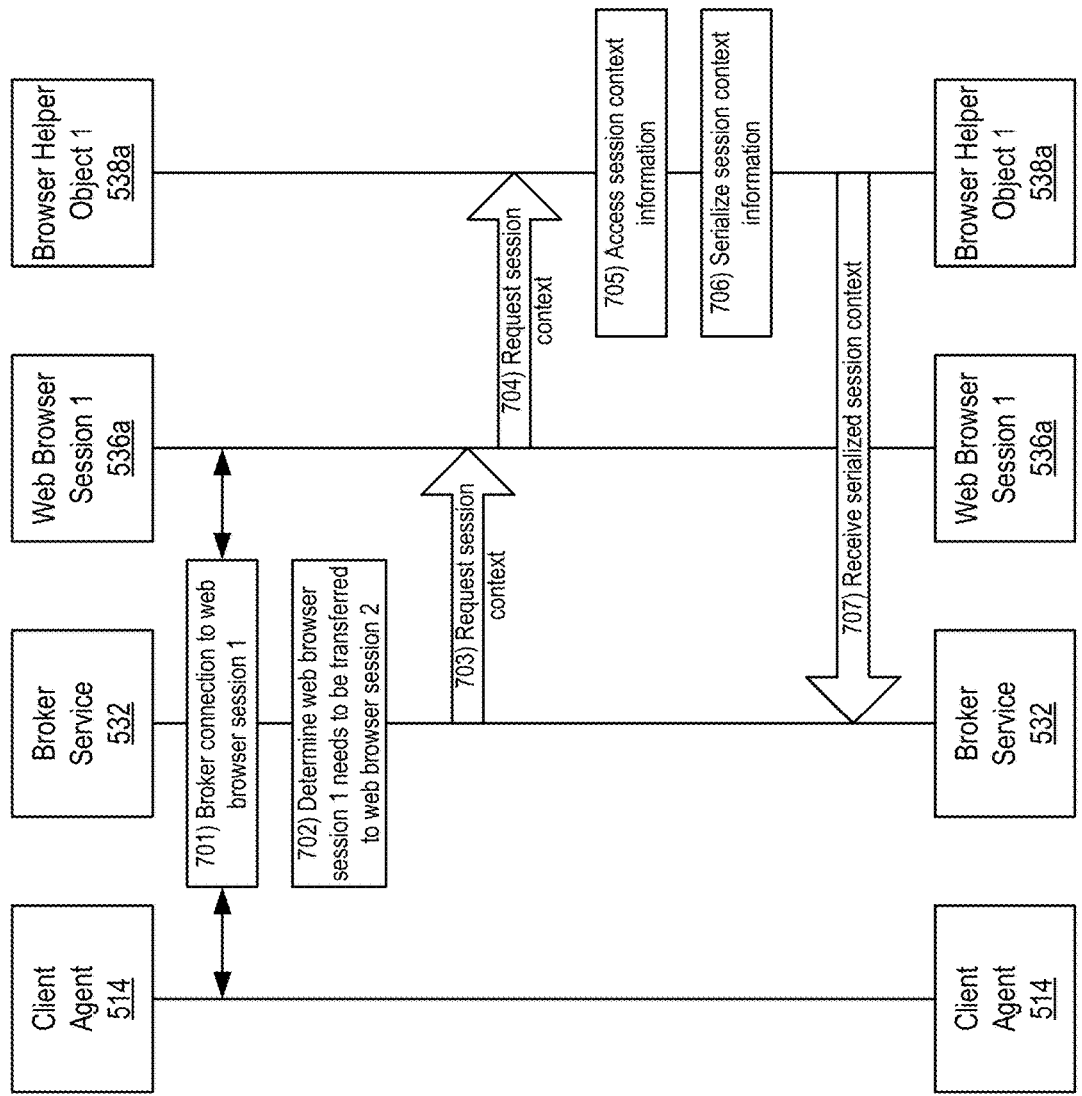
FIGS. 7A-7B depict an example event sequence for providing a method to transfer a web browser server session from one browser server to another browser server in a browser server pool in accordance with one or more illustrative aspects described herein.
Figure 7B:
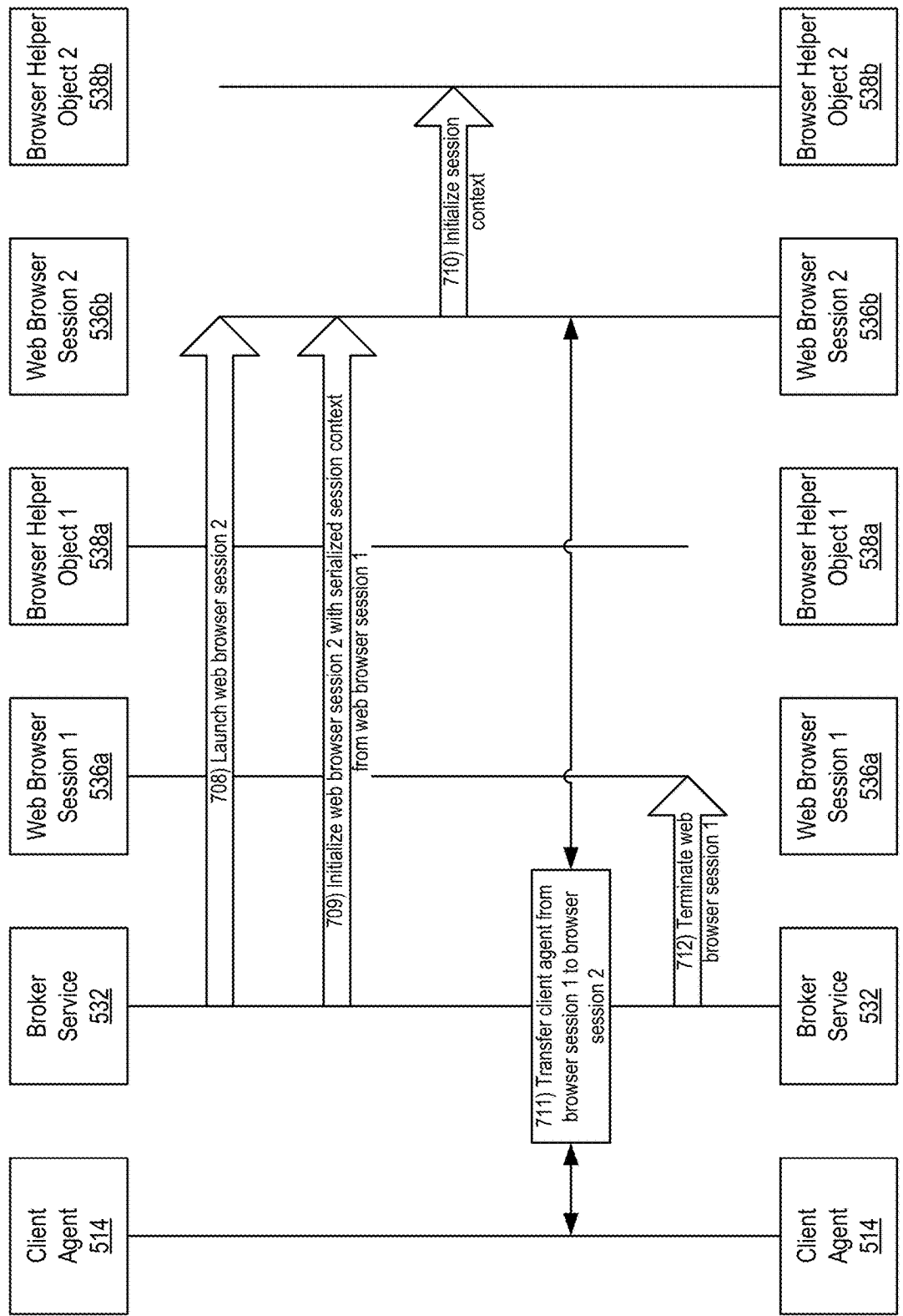

FIGS. 7A-7B depict an example event sequence that illustrates a method of transferring a web browser server session from one browser server to another browser server in a browser server pool. As seen in FIGS. 7A-7B, one or more steps of the depicted example event sequence and other similar examples described herein may be performed in a computing environment such as the system illustrated in FIG. 5, as well as other systems having different architectures (e.g., all or part of FIGS. 1-4). In other embodiments, the method illustrated in FIGS. 7A-7B and/or one or more steps thereof may be embodied in a computer-readable medium, such as a non-transitory computer readable memory.

Referring to FIG. 7A, step 701, the broker service 532 may broker a connection between client devices 510 and the web browser sessions 536 running in the browser server pool 534. The broker service 532 may use one or more criteria to determine one of the browser servers 534 in the browser server pool 534 to connect to the client device 510. In one of several possible embodiments, the broker service 532 may randomly select a browser server 534 from the browser server pool 534. In other embodiments, the broker service 532 may select a browser server 534 from the browser server pool 534 in a round-robin fashion. For example, broker service 532 may broker a connection between client device 510 and web browser session 1 536a running in browser server 1 534a. In step 702, the broker service 532 may determine that active web browser session 1 536a needs to be transferred to browser server 2 534b. In step 703, the broker service 532 may request the session context information from active web browser session 1 536a. In response to the request from the broker service 532, in step 704, the web browser session 1 536a may request browser helper object 1 538a to generate and transmit the session context information for web browser session 1 536a.

In step 705, the browser helper object 1 538a, responsive to the request from the web browser session 1 536a, may access the session context information of web browser session 1 536a. The session context information may include one or more session cookies, one or more uniform record locator (URL) addresses, one or more Hypertext Transfer Protocol (HTTP) headers, and the like. In step 706, the browser helper object 1 538a, responsive to the request from the web browser session 1 536a, may serialize the session context information. In step 707, the broker service 532 may receive, in response to the session context request, the serialized session context information from browser helper object 1 538a in web browser session 1 536a.

Referring to FIG. 7B, in step 708, the broker service 532 may launch web browser session 2 536b in browser server 2 534b. In step 709, the broker service 532 may initialize web browser session 2 536b with the serialized session context information from web browser session 1 536a. In step 710, the browser helper object 2 538b may initialize the session context for web browser session 2 536b. After initialization, web browser session 2 536b may be in the same location and in the same state as web browser session 1 536a. In step 711, the broker service 532 may transfer the client agent 514 from web browser session 1 536a to web browser session 2 536b, while maintaining the session context of web browser session 1 536a. The broker service 532 may switch the client agent 514 from web browser session 1 536a to web browser session 2 536b in such a manner as to minimize user disruption. That is, broker service 532 may transfer the web browser sessions 536 in a seamless and transparent manner such that there is no apparent indication to the user operating the client device 510 that the transfer occurred. In step 712, the broker service 532 may terminate web browser session 1 536a in browser server 1 534a.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
providing, by a computing device, a browser in which to access a session of an application, the computing device being one of a pool of devices;
receiving, by the computing device, a request for context information of the session, the context information configured to enable another computing device to initialize a new session of the application in a state the same as that of the session accessible via the browser of the computing device;
retrieving, by the computing device, the context information of the session from the browser of the computing device; and
providing, by the computing device, the context information to support launch of the new session of the application at the another computing device so as to balance a load across the pool of devices,
wherein, in response to the request, a first browser helper object of the computing device accesses the context information, serializes the context information, and transmits the serialized context information to a second browser helper object of the another computing device to initialize the new session of the application in a same state as that of the session accessible via the browser at the another computing device, and
wherein the first browser helper object is different from the second browser helper object.

2. The method of claim 1, further comprising maintaining the serialized context information of the session during transfer of a client agent from the session to the new session.

3. The method of claim 1, wherein the pool of devices is configured to provide remote desktop service functionality.

4. The method of claim 1, further comprising:
after determining that there is no active session in the browser of the computing device, disconnecting the browser from a web browser session.

5. The method of claim 1, wherein the context information comprises at least one of a session cookie, a uniform record locator (URL) address, and a Hypertext Transfer Protocol (HTTP) header.

6. A method, comprising:
provisioning, by a broker service, a browser server pool comprising a first browser server and a second browser server, wherein the first browser server comprises a first browser helper object and the second browser server comprises a second browser helper object, and wherein the first browser helper object is different from the second browser helper object; and
after determining that a first web browser session is to be transferred from the first browser server to the second browser server:
requesting, by the broker service, a session context from the first web browser session, wherein the first browser helper object on the first browser server accesses the session context from the first web browser session, serializes the session context, and transmits the serialized session context to the broker service;
receiving, by the broker service, the serialized session context from the first web browser session;
launching, by the broker service, a second web browser session hosted by the second browser server, wherein the second browser helper object initializes the second web browser session in a same state as the first web browser session and based on the serialized session context; and
transferring, by the broker service, a client agent from the first web browser session to the second web browser session.

7. The method of claim 6, wherein launching the second web browser session comprises:
maintaining the serialized session context from the first web browser session in the second web browser session.

8. The method of claim 6, further comprising:
determining, by the broker service, whether the first browser server has any active web browser sessions; and
upon determining that the first browser server has no active web browser sessions, powering down the first browser server.

9. The method of claim 6, wherein determining that the first web browser session is to be transferred comprises:
monitoring, by the broker service, a server load across the browser server pool; and
balancing, by the broker service, the server load across the browser server pool.

10. The method of claim 6, wherein the browser server pool is configured to provide remote desktop server functionality.

11. The method of claim 6, wherein the browser server pool is hosted in a cloud service.

12. The method of claim 6, wherein the session context comprises one or more session cookies, one or more uniform record locator (URL) addresses, or one or more Hypertext Transfer Protocol (HTTP) headers.

13. A system, comprising:
at least one processor; and
at least one memory storing computer executable instructions that, when executed by the at least one processor, cause the system to:

provide, by means of a computing device, a browser in which to access a session of an application, the computing device being one of a pool of devices;

receive a request for context information of the session, the context information configured to enable another computing device to initialize a new session of the application in a state the same as that of the session accessible via the browser of the computing device;

retrieve the context information of the session from the browser of the computing device; and provide the context information to support launch of the new session of the application at the another computing device so as to balance a load across the pool of devices, wherein, in response to the request, a first browser helper object of the computing device accesses the context information, serializes the context information, and transmits the serialized context information to a second browser helper object of the another computing device to initialize the new session of the application in a same state as that of the session accessible via the browser at the another computing device, and wherein the first browser helper object is different from the second browser helper object.

14. The system of claim 13, further comprising additional executable instructions that, when executed by the at least one processor, cause the system to:

maintain the serialized context information of the session during transfer of a client agent from the session to the new session.

15. The system of claim 13, wherein the pool of devices is configured to provide remote desktop service functionality.

16. The system of claim 13, further comprising additional executable instructions that, when executed by the at least one processor, cause the system to:

after determining that there is no active session in the browser of the computing device, disconnecting the browser from a web browser session.

17. The system of claim 13, wherein the session context comprises one or more session cookies, one or more uniform record locator (URL) addresses, and one or more Hypertext Transfer Protocol (HTTP) headers.

* * * * *